W. C. CARTER.
INTERNAL COMBUSTION ENGINE.
APPLICATION FILED MAR. 20, 1911.
1,040,508.
Patented Oct. 8, 1912.
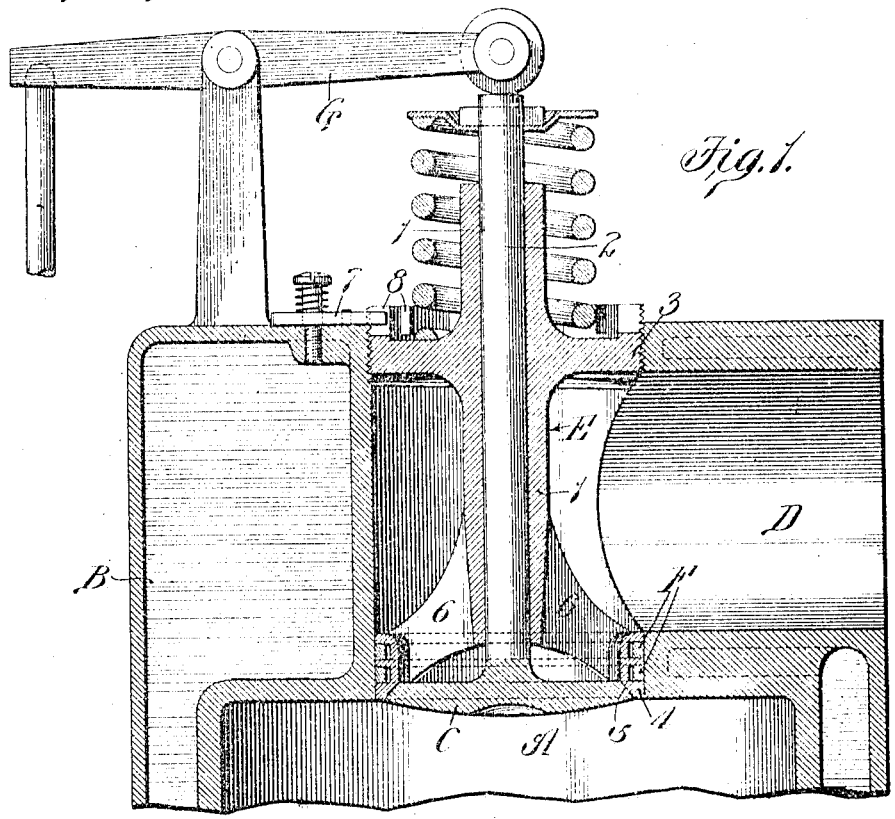
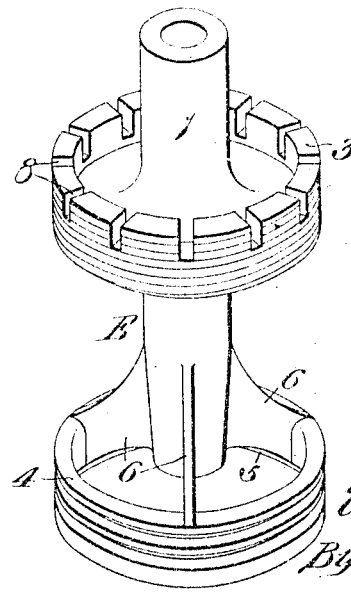
Witnesses:
Geo. R. Ladson
W. L. Church
Inventor,
William C. Carter.
By Paul Bakewell, Atty.

UNITED STATES PATENT OFFICE.

WILLIAM C. CARTER, OF ST. LOUIS, MISSOURI, ASSIGNOR OF ONE-HALF TO CHARLES OTTO BAXTER, OF ST. LOUIS, MISSOURI.

INTERNAL-COMBUSTION ENGINE.

1,040,508.  Specification of Letters Patent.  Patented Oct. 8, 1912.

Application filed March 20, 1911. Serial No. 615,505.

*To all whom it may concern:*

Be it known that I, WILLIAM C. CARTER, a citizen of the United States, residing at St. Louis, Missouri, have invented a certain new and useful Improvement in Internal-Combustion Engines, of which the following is a full, clear, and exact description, such as will enable others skilled in the art to which it appertains to make and use the same.

This invention relates to internal combustion engines, and particularly to engines of the type in which the valves are arranged in cages mounted in the cylinder of the engine.

A great deal of trouble has been experienced with internal combustion engines of the type now in general use owing to the fact that the expansion and contraction of the metal from which the valve cages are formed causes an open space or joint to be formed around the valve cage through which the gases in the cylinder escape.

The main object of my invention is to provide an engine of the type referred to which is so designed that an absolutely tight joint is insured at all times between the valve cage and the wall of the cylinder in which the cage is mounted.

Another object is to provide an engine having a valve cage which is so designed that the cage can expand and contract without affecting the operation of the engine or permitting the gases in the cylinder to escape. And still another object is to provide an engine having a valve cage which is adapted to be adjusted relatively to the valve-operating mechanism so as to insure proper coaction between the valve and the mechanism that operates same.

Figure 1 of the drawings is a vertical sectional view of a portion of the cylinder of an internal combustion engine constructed in accordance with my invention; and Fig. 2 is a perspective view of the valve cage.

I have herein illustrated my invention embodied in an engine in which the valves are arranged in the head of the cylinder but it will, of course, be obvious that the exact location of the valve is immaterial so far as my broad idea is concerned.

Referring to the drawings, A designates an engine cylinder provided with a water-jacket B.

C designates one of the valves, for example, the outlet valve or exhaust valve that governs the passage of the burnt gases into the exhaust manifold D, and E designates a cage arranged in the head of the cylinder for carrying the valve C. Said cage is provided with a guide 1 in which the stem 2 of the valve is reciprocatingly mounted, a part 3 that is connected to the outer wall of the cylinder, or rather the outer wall of the water-jacket, and operating to hold the cage in position, and a ring-shaped portion or annular sleeve 4 loosely mounted in an opening in the inner wall of the cylinder and provided with a seat 5 for the valve C, the ring-shaped portion 4 of the cage being connected to the valve stem guide 1 by means of webs 6. Preferably, the top part 3 of the cage is screwed into the outer wall of the water-jacket.

A packing F of any suitable material and of any preferred construction, is provided for insuring a tight joint between the ring-shaped portion 4, or annular sleeve of the valve cage and the wall of the cylinder with which said portion 4 coöperates, and in the preferred form of my invention as herein shown, the packing F consists of one or more split rings arranged in grooves formed in the exterior of the portion 4 of the valve cage.

In view of the fact that the valve cage E is connected to the cylinder at only one point, namely, where the threads on the top part 3 engage the coöperating threads on the cylinder, the lower portion or inner portion of the cage can expand longitudinally when it becomes hot and can contract longitudinally when it subsequently cools off without causing a joint or open space to be formed around the cage through which the gases in the cylinder can escape, the ring-shaped portion 4 of the cage sliding in and out of the opening provided for same in the inner wall of the cylinder, and the packing F on said ring-shaped portion 4 remaining in intimate engagement with the wall of said cylinder; and another desirable feature of such a structure is that proper coaction between the rocker arm G of the valve-operating mechanism and the stem 2 of the valve can be effected by adjusting the valve cage E inwardly or outwardly so as to move the outer end of the valve stem 2 toward and away from the rocker arm. After the valve cage has been adjusted in proper position it is locked by means of a spring-actuated pawl 7 that coöperates with notches 8 on the top portion 3 of the valve cage. Any other suitable means may be used for locking the valve cage in adjusted position, however, and while I have herein shown the cage as being provided with a screw-threaded portion 3 that is screwed into the cylinder, it would, of course, be possible to connect the cage to the cylinder in various other ways. Therefore, I do not wish it to be understood that my invention is limited to the exact construction herein shown for my broad idea consists in a valve cage secured at its outer end to the cylinder and provided at its inner end with a portion which can move freely in the opening provided for same in the inner wall of the cylinder when the metal from which the cage is formed expands and contracts, and a suitable packing arranged between this portion and the cylinder so as to insure a tight joint between said parts at all times.

Having thus described my invention, what I claim as new and desire to secure by Letters Patent is:

1. An internal combustion engine having a cylinder provided in one of its walls with an opening of uniform diameter throughout its entire length, a valve cage for an inwardly opening valve having a portion that projects into said opening, and an expansible packing device arranged between said portion and the side walls of said opening so as to provide for the expansion and contraction of the cage and thus produce a tight joint between the cage and the cylinder at all times.

2. In an internal combustion engine, a cylinder having an opening of uniform diameter formed in its inner wall, a valve cage arranged in the cylinder and connected at its outer end to the cylinder, an inwardly opening valve seated in said cage, said cage being provided at its inner end with a portion which fits freely in the opening in the inner wall of the cylinder, and an expansible packing arranged between the peripheral edge of said portion and the edge of the opening in which said portion is arranged so as to provide for the expansion and contraction of the cage.

3. In an internal combustion engine, a cylinder, a valve cage provided at its inner end with a portion which fits freely in an opening in the cylinder, an expansible packing arranged between the peripheral edge of said portion and the edge of the opening in the cylinder in which said portion is arranged so as to provide for the expansion and contraction of the cage, and an inwardly opening valve mounted in said cage.

4. In an internal combustion engine, a cylinder, a valve cage provided at its inner end with a sleeve portion which fits freely in an opening in the cylinder, an expansible packing arranged between the peripheral edge of said sleeve portion and the edge of the opening in the cylinder in which said portion is arranged so as to provide for the expansion and contraction of the cage, and an inwardly opening valve seated in said sleeve portion.

5. In an internal combustion engine, a cylinder, a valve cage provided at its inner end with a sleeve portion which fits freely in an opening in the cylinder, an expansible packing arranged between the peripheral edge of said sleeve portion and the edge of the opening in the cylinder in which said portion is arranged so as to provide for the expansion and contraction of the cage, an inwardly opening valve seated in said sleeve portion, a stem on said valve, and a guide on said cage through which said stem passes.

6. In an internal combustion engine, a cylinder, an inwardly opening valve provided with a stem, an operating mechanism that coöperates with said stem, a cage for said valve adjustably mounted in said cylinder in such a manner that it can be moved inwardly and outwardly so as to vary the position of said valve stem with relation to said operating mechanism, a sleeve portion at the inner end of said cage which fits freely in an opening provided for same in the cylinder, and an expansible packing arranged between the peripheral edge of said sleeve portion and the edge of the opening in the cylinder in which said portion is arranged so as to provide for the expansion and contraction of the cage.

In testimony whereof I hereunto affix my signature in the presence of two witnesses, this eighteenth day of March, 1911.

WILLIAM C. CARTER.

Witnesses:
　WELLS L. CHURCH,
　GEORGE BAKEWELL.